Sept. 22, 1931.  O. R. GRÖNKWIST  1,824,540
APPARATUS FOR PRODUCING A LUBRICATING OIL MIST
Original Filed May 6, 1922
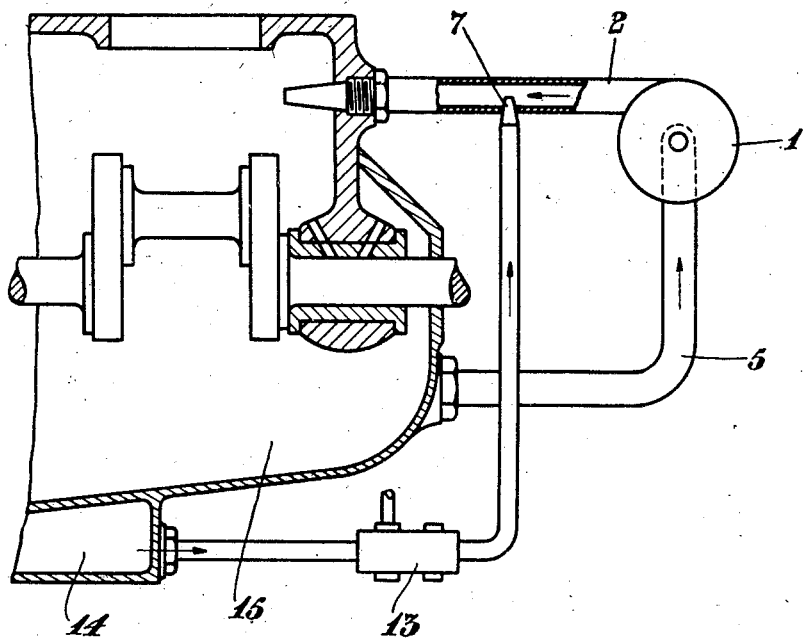
Inventor:
OSCAR ROBERT GRONKWIST
By George Bayard Jones
Atty.

Patented Sept. 22, 1931

1,824,540

UNITED STATES PATENT OFFICE

OSCAR ROBERT GRÖNKWIST, OF KATRINEHOLM, SWEDEN

APPARATUS FOR PRODUCING A LUBRICATING OIL MIST

Original application filed May 6, 1922, Serial No. 559,035, and in Germany May 7, 1921. Divided and this application filed September 24, 1925. Serial No. 58,412.

The present invention relates to an apparatus for producing a lubricating oil mist for the lubrication of engine parts which work in closed casings, but which do not run in oil, such for instance as cranks, connecting rods, and valve operating gears in internal combustion engines. It has previously been proposed to produce such lubricating oil mist by inserting in the casing a spraying nozzle through which the lubricant is injected under pressure into the casing and sprayed therein. It has been found in practice, however, that the very fine apertures in the nozzle will very easily become clogged so that the lubrication fails.

The present invention has for its purpose to eliminate this disadvantage and to provide a still finer distribution and atomization of the oil. For this purpose the lubricating oil is atomized according to the invention by means of a gas current which is forced to move in a circuit. For this purpose there may be inserted in said circuit a fan for producing and maintaining the gas current.

In the accompanying drawing a lubricating device constructed according to the present invention is illustrated by way of example, partly in section.

Referring to the drawing 1 denotes the fan, 2 the pressure pipe from the fan, 5 the suction pipe, 7 the nozzle-like oil supply pipe which communicates with the pump 13, which latter draws lubricating oil from the oil collecting tank 14 and injects the oil into the pressure pipe 2. When the fan 1 is put in operation it will always force a certain quantity of air into the crank casing 15 of the engine, and simultaneously it draws an equal quantity of air from said casing. When the air current circulated in this manner passes the orifice of the nozzle 7, it atomizes the lubricating oil forced out through said orifice, and carries said oil in a finely atomized state into the crank casing 15 which in this manner will always be filled with a lubricating oil mist. The oil which is not consumed, settles on the walls and collects in the oil tank 14 from which it is pumped to the nozzle pipe 7, as above stated.

I claim:

1. An apparatus for producing a lubricating oil mist in a closed casing, comprising in combination with such casing, a circulation passage connected at both ends to such casing, a fan in said passage for generating and maintaining a current of gas in the same, and means for admitting oil into and atomizing the same by said current in said passage.

2. An apparatus for producing a lubricating oil mist in a closed casing, comprising in combination with such casing, a circulation passage connected to said casing, a fan in said passage for generating and maintaining a current of gas in the same, and means for drawing oil from said casing and admitting such oil into and atomizing the same by said current in said passage.

3. An apparatus for producing a lubricating oil mist in a closed crank casing of an internal combustion engine, comprising in combination with such casing, a circulation passage connected to said casing and located entirely outside the combustion chamber of such engine, a fan in said passage for generating and maintaining a current of gas in the same, and means for admitting oil into and atomizing the same by said current in said passage.

4. An apparatus for producing a lubricating oil mist in a closed casing, comprising in combination with such casing, a closed circuit circulation passage connected to said casing, means for admitting oil to be atomized into said passage, and a fan in said passage for generating and maintaining a current of gas in the circulation passage.

OSCAR ROBERT GRÖNKWIST.